(12) United States Patent
Imamura

(10) Patent No.: US 6,581,089 B1
(45) Date of Patent: Jun. 17, 2003

(54) PARALLEL PROCESSING APPARATUS AND METHOD OF THE SAME

(75) Inventor: Yoshihiko Imamura, Ibaraki (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/292,331

(22) Filed: Apr. 15, 1999

(30) Foreign Application Priority Data

Apr. 16, 1998 (JP) .......................................... 10-106754
Apr. 16, 1998 (JP) .......................................... 10-106756

(51) Int. Cl.$^7$ ................................................ G06F 9/00
(52) U.S. Cl. ...................................... 709/107; 709/108
(58) Field of Search .......................... 707/400; 712/16; 709/107, 108

(56) References Cited

U.S. PATENT DOCUMENTS 5,519,877 A * 5/1996 Yoneda et al. ............... 709/400
5,765,009 A * 6/1998 Ishizaka ....................... 712/16
5,875,320 A * 2/1999 Gu .............................. 709/400

FOREIGN PATENT DOCUMENTS

EP          930 574    *  7/1999

OTHER PUBLICATIONS

Michael et al. Relative Performance of Preemption–safe Locking and Non–Blocking Synchronization on Multiprogrammed Shared Memory Multiprocessors IEEE 1997.*

* cited by examiner

Primary Examiner—Larry D. Donaghue
(74) Attorney, Agent, or Firm—Rader, Fishman & Grauer PLLC; Ronald P. Kananen, Esq.

(57) ABSTRACT

A parallel processing apparatus capable of flexibly solving at a high speed the problem of synchronization wait when a plurality of tasks are generated, wherein a processor element PE12 specifies pipe counters and calls up a plurality of tasks with respect to processor elements PE13 to PE15 and waits for synchronization according to need by a synchronization wait command, an arbiter 56 increases a count value of a corresponding pipe counter when a task is called up and decreases the count value of the corresponding pipe counter when the task is ended, and the processor element PE12 compares the count value contained in the synchronization wait command and the count value of the corresponding pipe counter of the arbiter 56 when executing the synchronization wait command, releases the synchronization wait when they coincide, and enters the synchronization wait when they do not coincide.

22 Claims, 16 Drawing Sheets

PARALLEL PROCESSING APPARATUS AND METHOD OF THE SAME

BACKGROUND OF THE INVENTION

1. Field of the Invention

The present invention relates to a parallel processing apparatus capable of flexibly solving at a high speed the problem of synchronization wait when a plurality of tasks are generated and a method of the same.

2. Description of the Related Art

For example, known in the art is a multiple instruction multiple datastream (MIMD) type multi-processor system in which a plurality of processor elements (PE) have independent program counters and execute the processing while mutually communicating via a common bus.

Such a multi-processor system is predicated on performing concurrent (parallel) multi-tasking and communicates between a processor element executing a main program and trying to generate a task and a processor element at which a new task is generated. At this time, there are cases where the program which called up (generated) the task waits for synchronization until the called (generated) task is ended.

FIG. 15 is an overall view of the configuration of a general multi-processor system 1.

As shown in FIG. 15, the multi-processor system 1 is comprised of four processor elements PE12, PE13, PE14, and PE15 and an arbiter 16 for managing the synchronization of tasks connected via a common bus 11.

The common bus 11 acts as a control line for transferring commands and other control signals among the processor elements PE12 to PE15.

Further, in the multi-processor system 1, the processor elements PE12, PE13, PE14, and PE15 and a common or shared memory 17 are connected via a main bus 19.

The common memory 17 is connected to an external memory (main memory) via an external terminal 18.

Note that, as the configuration of the multi-processor system for realizing synchronization of multi-tasking, there are various types other than the configuration shown in FIG. 15.

For example, in the example shown in FIG. 15, a case where the synchronization of tasks is centrally managed by the arbiter 16 was shown, but it is also possible to not provide the arbiter 16 and impart a function for managing the synchronization of tasks to individual processor elements PE12 to PE15.

FIG. 16 is a view for explaining a procedure for a program generating a task (i.e. program 25) to wait for synchronization.

In the example shown in FIG. 16, the main program 25 operating on the processor element PE12 generates a task 26 on the processor element PE13.

The processor elements PE12 and PE13 operate by executing commands described by the machine language inherent to the individual processors.

It may be noted that it is also possible to generate the task and solve the synchronization even by using hardware sequential circuits.

It may also be note that, in the present specification, a case where the synchronization function is realized by commands will mainly be explained.

Turning to the problem to be solved by the invention, in the multi-processor system of the related art, it has been difficult to generate a plurality of tasks from the main program 25 shown in FIG. 16 in the exact number desired for following reasons.

Namely, the multi-processor system executes the concurrent multi-tasking, but in this multi-task method, it is necessary to allocate a plurality of programs (tasks) to a plurality of processor elements PE.

Here, with multi-tasking assuming a single processor, the most general practice is to allocate a plurality of tasks to one processor element PE by time division such as by a time sharing system (TSS). Accordingly, it is sufficient to prepare only one task management table for the one processor element PE.

In many cases where this TSS method is adopted, an operating system such as Unix (Trade Mark of MIT) having a task switching mechanism is used.

Usually, the processor element PE frequently is not provided with a synchronization command particularly conscious of multi-tasking. Rather than a synchronization command, therefore a method is often adopted in which exception handling is generated through a timer or other external interruption event and as a result the tasks are switched. Further, in order to execute the switching of the tasks at a higher speed, hardware support is frequently provided inside the processor element PE, but basically the task switching function is realized by software.

Contrary to this, in the multi-processor system, when adopting the TSS method, it becomes necessary to provide a plurality of task management tables. Further, it is necessary to prepare a program for comprehensively managing these plurality of task management tables at a higher level than the programs for managing individual processor elements PE, so the operating system becomes considerably complex. For this reason, in the multi-processor system of the related art, it has been difficult to generate exactly the desired number of tasks from the main program 25 shown in FIG. 16.

It is noted that, the operating system loaded in a multi-processor system is usually determined by the user using that multi-processor system.

There are also methods for realizing multi-tasking other than the TSS method. Applications to somewhat special purposes, for example, use of specific processor elements PE as co-processors, can be considered. Other than this, a method of permanently providing programs to be executed by co-processors, even if not fixing specific processor elements PE as co-processors, is very effective in certain fields. In any case, a mechanism for synchronization of tasks is necessary for a multi-processor system.

In the multi-processor systems in the research and prototype stage, in general, operating systems the same as that of a single processor are loaded in every processor element PE. By communicating among these processor elements PE, multi-tasking is achieved as a whole in many cases. In this case, the synchronization mechanism is used in part of the function of communication among the processor elements PE. Alternatively, a synchronization mechanism using a semaphore or other memory can be adopted.

However, in actuality, when it comes to the generation of tasks and the synchronization wait of the tasks, since in the end processing is performed by software in all cases, the response is bad, therefore this is applied at most to a case of executing rough parallel programs. Further, even in a system that can sufficiently generate a plurality of tasks, there is no decisive means for a solution to be found in these methods of waiting for tasks to end (i.e., a synchronization wait).

All combinations of conditions set, such as which task among the plurality of tasks generated from a main program is to be waited for, are possible if programming by software, but the overhead of time spent for judging these conditions becomes considerably large, so a high speed synchronization is not possible.

On the other hand, the conditions set are sometimes determined by hardware.

For example, a handshake synchronization wait system has been established between the microprocessor 8086 developed by Intel Co. of the U.S. and the coprocessor 8087 designed exclusively for that processor. When executing a command for an arithmetic operation of the main program on the processor 8086, the coprocessor 8087 automatically starts processing interpreting that command. Usually, a plurality of clock cycles has been considered necessary for the execution of an arithmetic operation. Accordingly, during this time, the processor 8086 sequentially executes the commands after that related command.

The main program contains a synchronization command after an appropriate number of commands from the task generation command. If the related arithmetic operation has been ended before the synchronization command is executed, the processor 8086 regards that the arithmetic operation is synchronized and proceeds with the execution of commands as it is. Alternatively, if the related arithmetic operation has not been ended before the synchronization command is executed, synchronization is waited for until the operation of the coprocessor 8087 is ended. This synchronization wait system uses a handshake signal based on a simple protocol and can achieve synchronization at a high speed with an extremely simple configuration.

However, it suffers from the disadvantage that a plurality of coprocessors 8087 cannot be connected to one processor 8086, so the problem of the synchronization wait when a plurality of tasks are generated cannot be solved.

SUMMARY OF THE INVENTION

An object of the present invention is to provide a parallel processing apparatus capable of flexibly solving at a high speed the problem of synchronization wait when a plurality of tasks are generated and a method of the same.

The present invention improves the overall performance of a multi-task system by improving the synchronization wait mechanism of the related art mentioned above.

In the previously described synchronization mechanism in a multi-processor system, it suffers from the disadvantage that a long time was required for recognizing the end of a task generated from a main program (hereinafter also described as a slave task). This is caused due to the multi-processor system of the related art attaching too much importance to general purpose usage and the selection of software solutions.

The present invention limits the general purpose use accompanying the generation of tasks and the synchronization of the same to a certain extent.

It is assumed that substantially freely any number of minutes are allowed for task generation. The operating states/ends of the slave tasks are automatically converted to numerical values (i.e., count values). In the main program, these numerical values are included in the execution conditions or establishment conditions of the synchronization command. Then, the numericalized operating states of the slave tasks and the synchronization command are used in combination. This makes it possible to generate a plurality of tasks. Further, for the synchronization command, the method of hardware recognition of the ends of slave tasks is adopted so as to increase the speed of the response.

Here, as a means for realizing the present invention, it is proposed that the processor element executing the main program store the number of generated slave tasks for every generation of a slave task. For this, it is also possible to simply combine a register and an adder/subtracter or merely provide a counter. Taking as an example a counter, 0 is set as an initial value and is incremented by 1 whenever a slave task is generated. Then, when a slave task is ended, after going through the proper procedure, this is notified to the processor element PE executing the main program and the previous count value is decremented by 1.

The processor element which executes the synchronization command in the main program compares the count value and the value of an argument added to the synchronization command at the time of execution of the synchronization command. If the count value is smaller or the same value as a result of comparison, it is regarded that the synchronization condition is established and the main program proceeds to the execution of commands following that synchronization command. If it is not (if the count value is larger), synchronization is waited for until the synchronization condition is satisfied.

After the execution of the synchronization command, it is also possible to initialize the value to 0 to prepare for the generation of a slave task. Alternatively, this does not have to be done. This is a matter for the user using the system.

Further, the position at which the counter is provided is not particularly limited. For example, it may be placed inside the processor element executing the main program or inside the arbiter module.

In the synchronization mechanism of the related art, when a plurality of slave tasks were generated, the method was adopted of describing all detailed synchronization conditions by software or waiting for the end of all slave tasks by hardware.

As opposed to this, in the present invention, the end of a slave task is recognized by hardware and a restriction is added to the synchronization conditions accompanying the synchronization wait command to simply set the number of the slave tasks to be synchronized. This enables a reduction of the size of the logical circuit while imparting a certain degree of flexibility to the synchronization mechanism.

That is, according to a first aspect of the present invention, there is provided a parallel processing apparatus provided with a plurality of counting means, a first processing means for executing at least one task call command including counting means designating data for designating one of the counting means, then waiting for synchronization in accordance with need by a synchronization wait command including counting means designating data and a count value satisfying the synchronization wait release conditions, at least one second processing means for executing a task called up from the first processing means and executing a task end command when the called up task has ended, wherein, each of the plurality of counting means increases the count value of a counting means indicated by the counting means designating data included in the task call command in accordance with execution of the task call command by the first processing means and decreases the count value of the counting means indicated by the counting means designating data of a task call command calling up a finished task in accordance with execution of the task end command by the second processing means; and the first processing means compares the count value included in the synchronization wait command and the count value of the counting means indicated by the counting means designating data included in the synchronization wait command and determines whether to release the synchronization wait in accordance with the result of the comparison.

Preferably, the first processing means releases the synchronization wait when the count value included in the synchronization wait command and the count value of the counting means indicated by the counting means designating data included in the synchronization wait command coincide.

More preferably, the count value included in the synchronization wait command is smaller than the number of tasks called up by a task call command including the same counting means designating data as the synchronization wait command.

Preferably, the processing in the first processing means and the processing in the at least one second processing means are performed independently from each other.

Preferably, the synchronization wait command has as arguments the counting means designating data and the count value satisfying a synchronization wait release condition.

Preferably, the first processing means and the at least one second processing means are connected through a common bus.

According to a second aspect of the present invention, there is provided a parallel processing method comprising executing, in a first processing, at least one task call command including counter designating data for designating one counter among a plurality of counters and waiting for synchronization by a synchronization wait command including counter designating data and a count value satisfying the synchronization wait release conditions; executing, in at least one second processing, a task called up from the first processing and executing a task end command when the called up task has ended; increasing the count value of a counter indicated by the counter designating data included in the task call command in accordance with execution of the task call command by the first processing and decreasing the count value of the counter indicated by the counter designating data of a task call command in accordance with execution of the task end command by the second processing; and comparing, in the first processing, the count value included in the synchronization wait command and the count value of the counter indicated by the counter designating data included in the synchronization wait command and determining whether to release the synchronization wait in accordance with the result of the comparison.

According to a third aspect of the present invention, there is provided a parallel processing apparatus comprising a first processing means for executing at least one task call command, then performing synchronization wait by a synchronization wait command in accordance with need; at least one second processing means for executing a task called up from the first processing means and executing a task end command at the time when the called up task has been ended; and a counting means for increasing a count value in accordance with execution of the task call command by the first processing means and decreasing a count value in accordance with execution of the task end command by the second processing means, the first processing means compares a count value included in the synchronization wait command and the count value of the counting means to determine whether to release the synchronization wait in accordance with the result of the comparison.

According to a fourth aspect of the present invention, there is provided a parallel processing method comprising executing, in a first processing, at least one task call command, then performing synchronization wait by a synchronization wait command in accordance with need; executing, in at least one second processing, a task called up from the first processing, and a task end command at the time when the called up task has been ended; increasing a first count value in accordance with execution of the task call command by the first processing and decreasing the first count value in accordance with execution of the task end command by the second processing; and comparing a second count value included in the synchronization wait command and the first count value and determining whether to release the synchronization wait in accordance with the result of the comparison.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Below, preferred embodiments of the multi-processor system according the present invention will be explained.

First Embodiment

Figure 1:
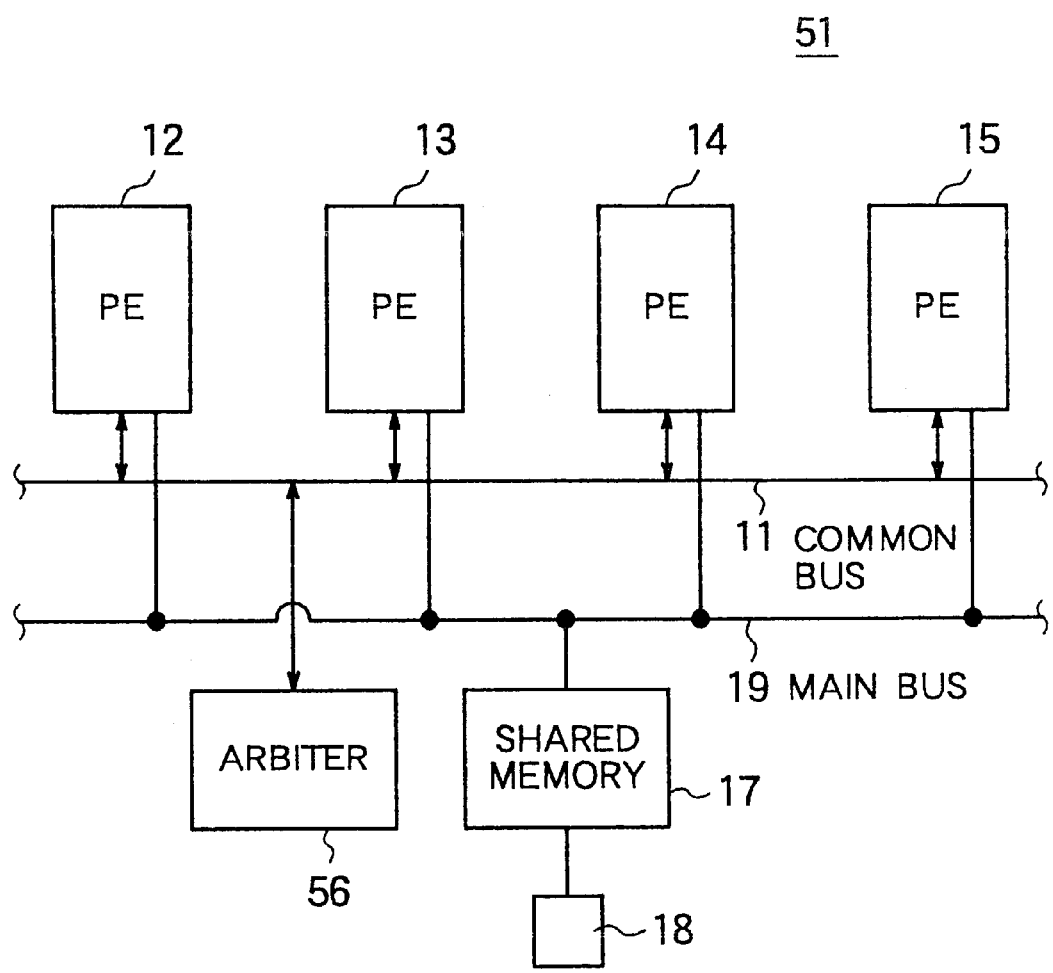
FIG. 1 is a view of the configuration of a multi-processor system according to a first embodiment of the present invention.

FIG. 1 is a view of the configuration of a multi-processor system 51 according to the present embodiment.

As shown in FIG. 1, the multi-processor system 51 is comprised of four processor elements PE12, PE13, PE14, and PE15 and an arbiter 56 for managing the synchronization of tasks connected via a common bus 11.

Further, in the multi-processor system 51, the processor elements PE12, PE13, PE14, and PE15 are connected with a common or shared memory 17 via a main bus 19.

The common memory 17 is connected to an external memory (i.e., a main memory) via an external terminal 18.

Figure 15:
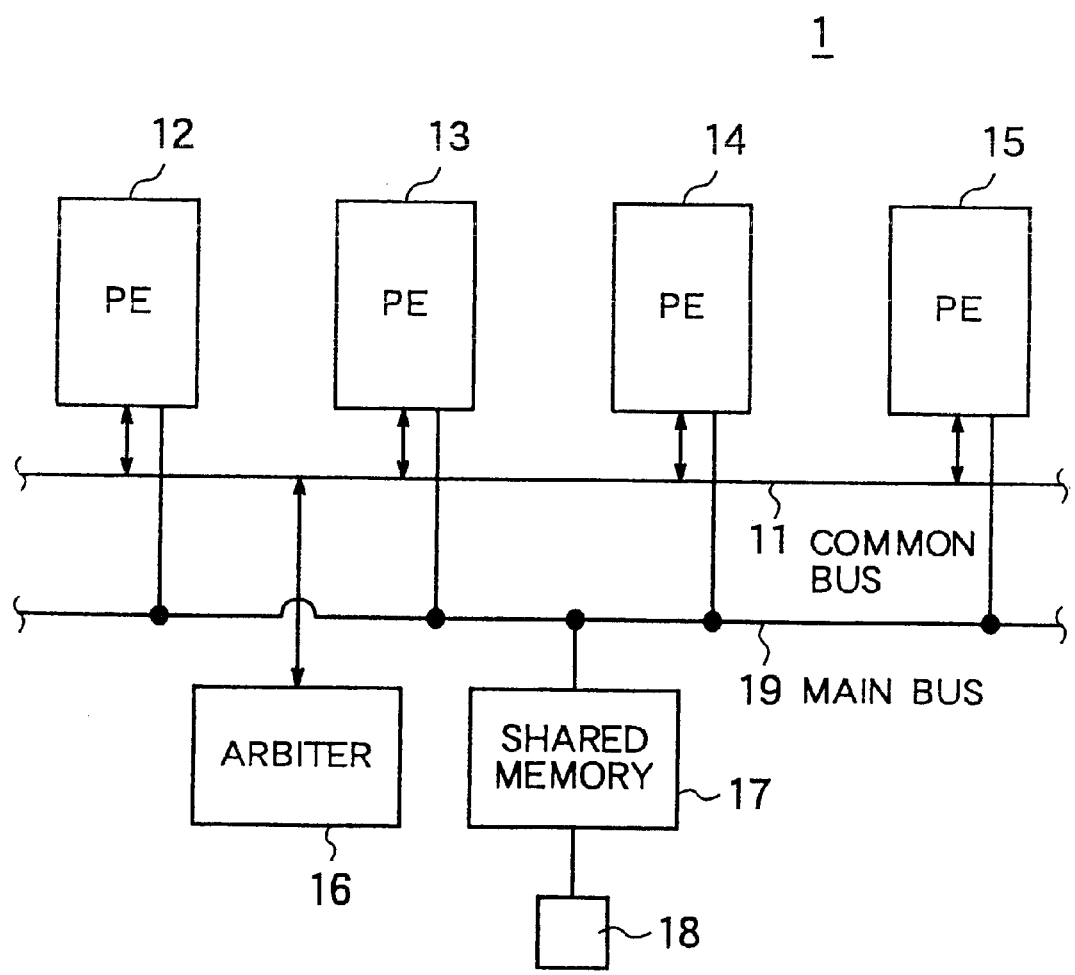
FIG. 15 is a view of the overall configuration of a general multi-processor system.
Figure 16:
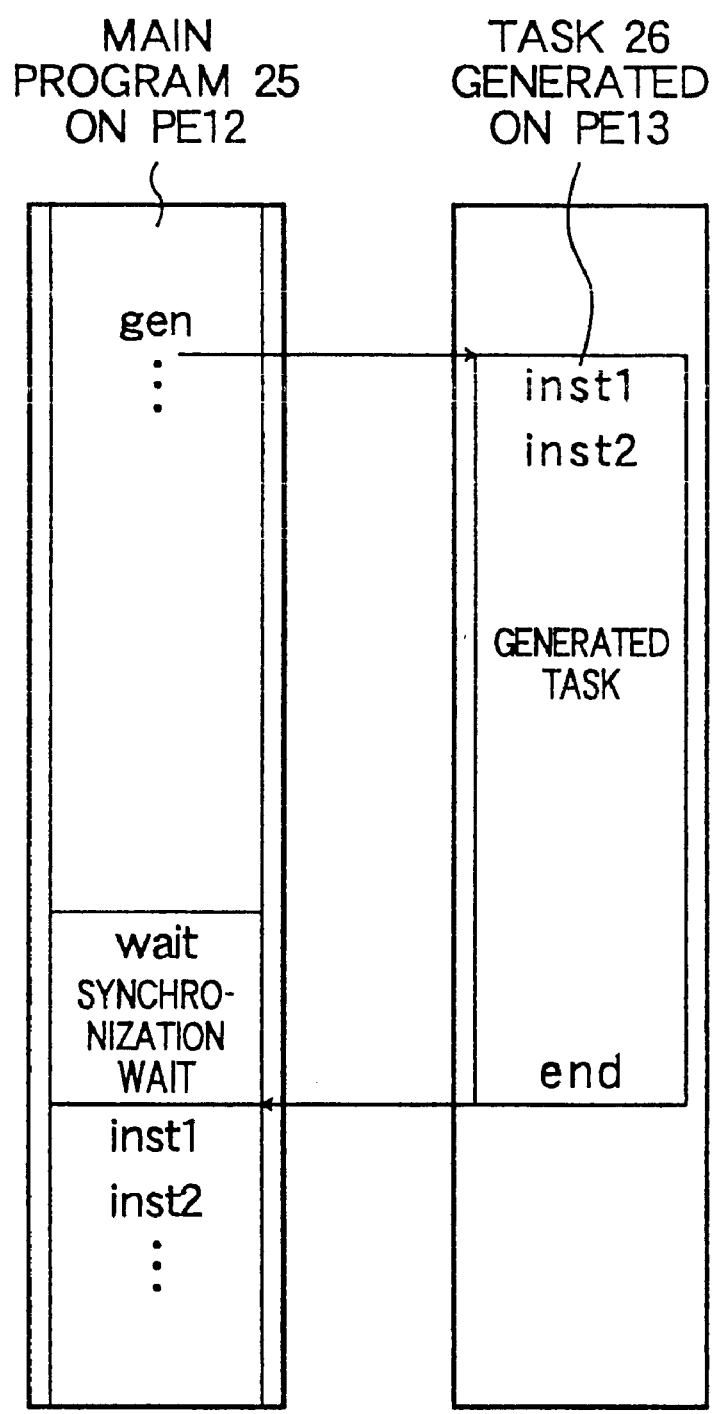
FIG. 16 is a view for explaining a procedure by which a program which generates a task waits for synchronization.

In FIG. 1, the processor elements PE12, PE13, PE14, and PE15, the common bus 11, the main bus 19, the common memory 17, and the external terminal 18 given the same reference numerals as those in FIG. 15 are the same as the constituent elements shown in FIG. 15 mentioned above.

Namely, the multi-processor system 51 is characterized in the method of management of task synchronization in the arbiter 56.

The arbiter 56 is provided with a counter. For example, it increases the count value of the counter by 1 when the processor element PE12 executes a command accompanied with the generation of a slave task, while it decreases the count value of the counter by 1 when a slave task is ended.

In the multi-processor system 51, any of the processor elements PE12 to PE15 can generate slave tasks with respect to other processor elements PE. A slave task transmits a message indicating the end of the slave task to the master program which called up that slave task at the end of the program. It is assumed that this message is sent by using the common bus 11 of FIG. 1, but may be of any form. It is also possible to strictly define the inter-processor communication or notify the message simply through a signal line.

Note that, for convenience of explanation, it is assumed that an address of a program generated as a slave task (e.g., an address on the main memory) is set in advance in the description of the main program.

Further, it is assumed that the slave tasks are generated on processor elements PE13 to PE15 other than the processor element PE12. Specifically on which processor element PE a slave task is generated is automatically determined by the arbiter 56 shown in FIG. 1.

In the present embodiment, the method of allocation of the slave tasks is not touched upon.

As the command for generating a slave task, for example, a "gen" command is used, but any name may be used. Accordingly, the "gen" command does not have to be a primitive machine language, but can be a macro command of an assembler language too.

In the program of a slave task, usual commands other than those concerning the task generation, synchronization, and end are described as"inst1" and "inst2". In the same way as above, any names of these commands and any method of composition may be used.

Further, the end command of the slave task is referred to as an "end". According to this command, a message indicating the end of a task is automatically sent to the processor element PE which called up the slave task. It is assumed that data and other information prepared at the slave task are appropriately processed.

Further, in the main program, the command for the synchronization wait is referred to as a"wait". As will be mentioned later, the argument can be set for this "wait" command.

Below, the operation of the multi-processor system 51 will be explained.

Case of Generation of Only Single Slave Task

Figure 2:
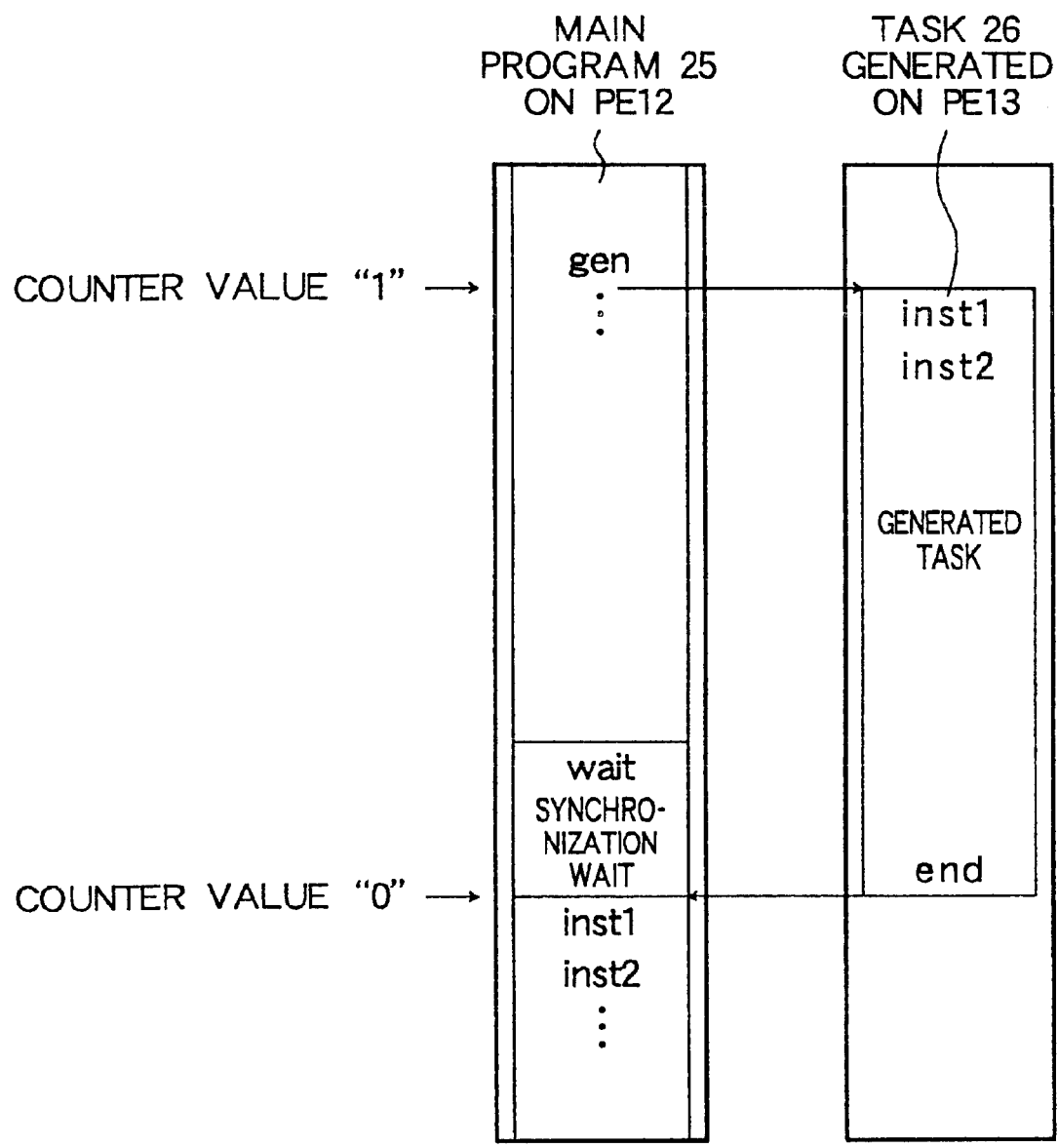
FIG. 2 is a view for explaining a program operating on a processor element PE in a case where one slave task is generated in the multi-processor system shown in FIG. 1.
Figure 3:
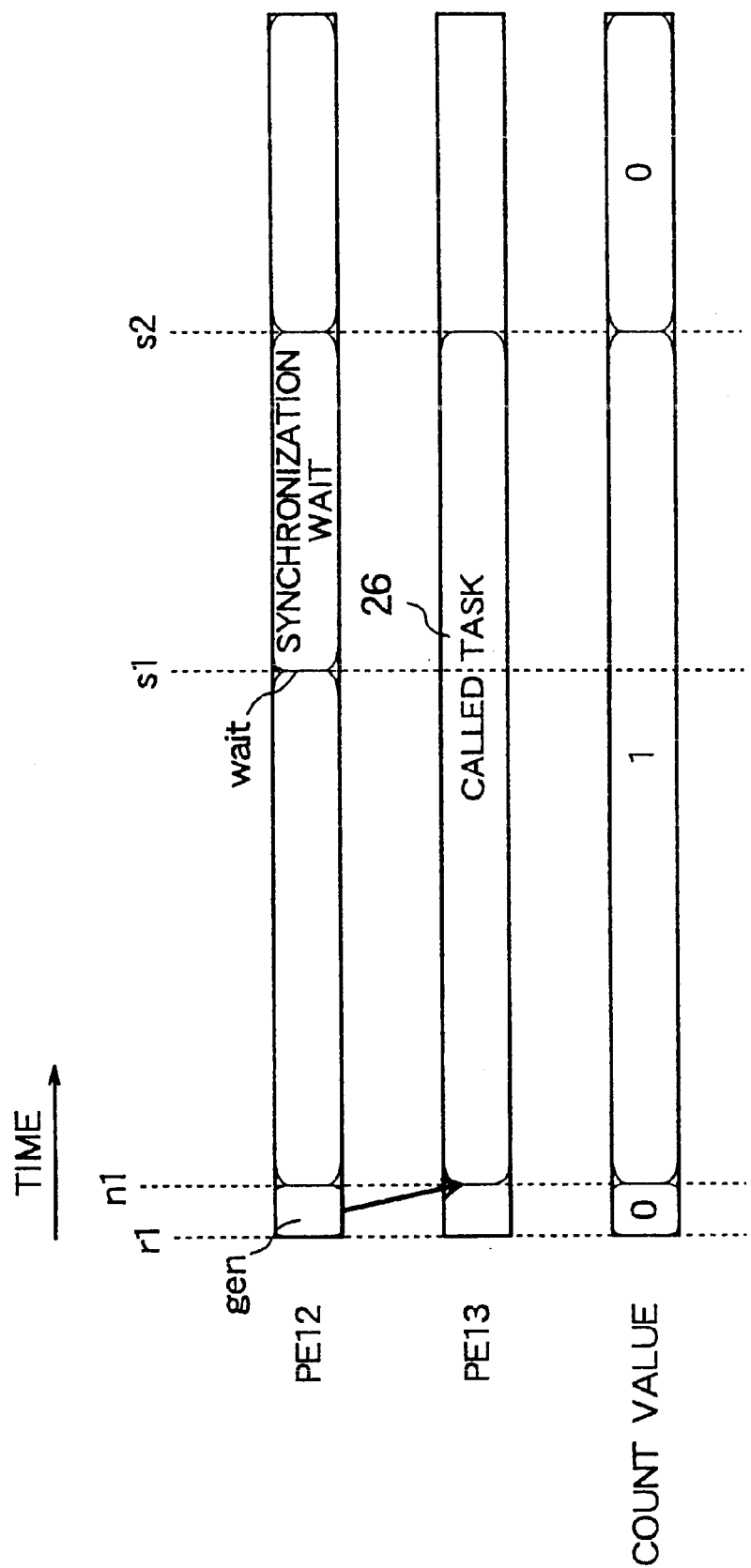
FIG. 3 is a view for explaining timings of task generation and synchronization wait release in the case shown in FIG. 2.

FIG. 2 is a view for explaining a program operating on a processor element PE where one slave task is generated in the multi-processor system 51; and FIG. 3 is a view for explaining timings of task generation and synchronization wait release in the case shown in FIG. 2.

Here, the "wait" command of the main program 25 makes the count value of the counter of the arbiter 56 becoming "0" a condition for synchronization wait release.

For example, at a timing "r1" shown in FIG. 3, the processor element PE12 executes the"gen" command contained in the main program 25 shown in FIG. 2 and, at a timing "n1", a task 26 is generated on the processor element PE13. At this time, the count value of the arbiter 56 is set at "1".

Then, the processor element PE13 executes commands such as "inst1" and "inst2" of the task 26.

Further, the processor element PE12 executes commands following the "gen" command of the main program 25. Then, at a timing "s1" shown in FIG. 3, the processor element PE12 executes the "wait" command shown in FIG. 2. At this time, since the count value of the arbiter 56 is "1", the processor element PE12 decides that the synchronization condition is not satisfied and enters the synchronization wait state.

Then, when the processor element PE13 executes the "end" command of the task 26 at a timing "s2" shown in FIG. 3, the task 26 is ended and, at the same time, the arbiter 56 becomes "0" since the count value is decremented by 1. By this, the synchronization condition is established, and the processor element PE12 executes the commands following the "wait" command of the main program 25.

Note that, in the case shown in FIG. 2 and FIG. 3, where the processor element PE12 executes the "end" command of the task 26 before the "wait" command contained in the main program 25 is executed, the processor element PE12 does not enter the synchronization wait state.

Case Where Plurality of Slave Tasks Are Generated (First)

Figure 4:
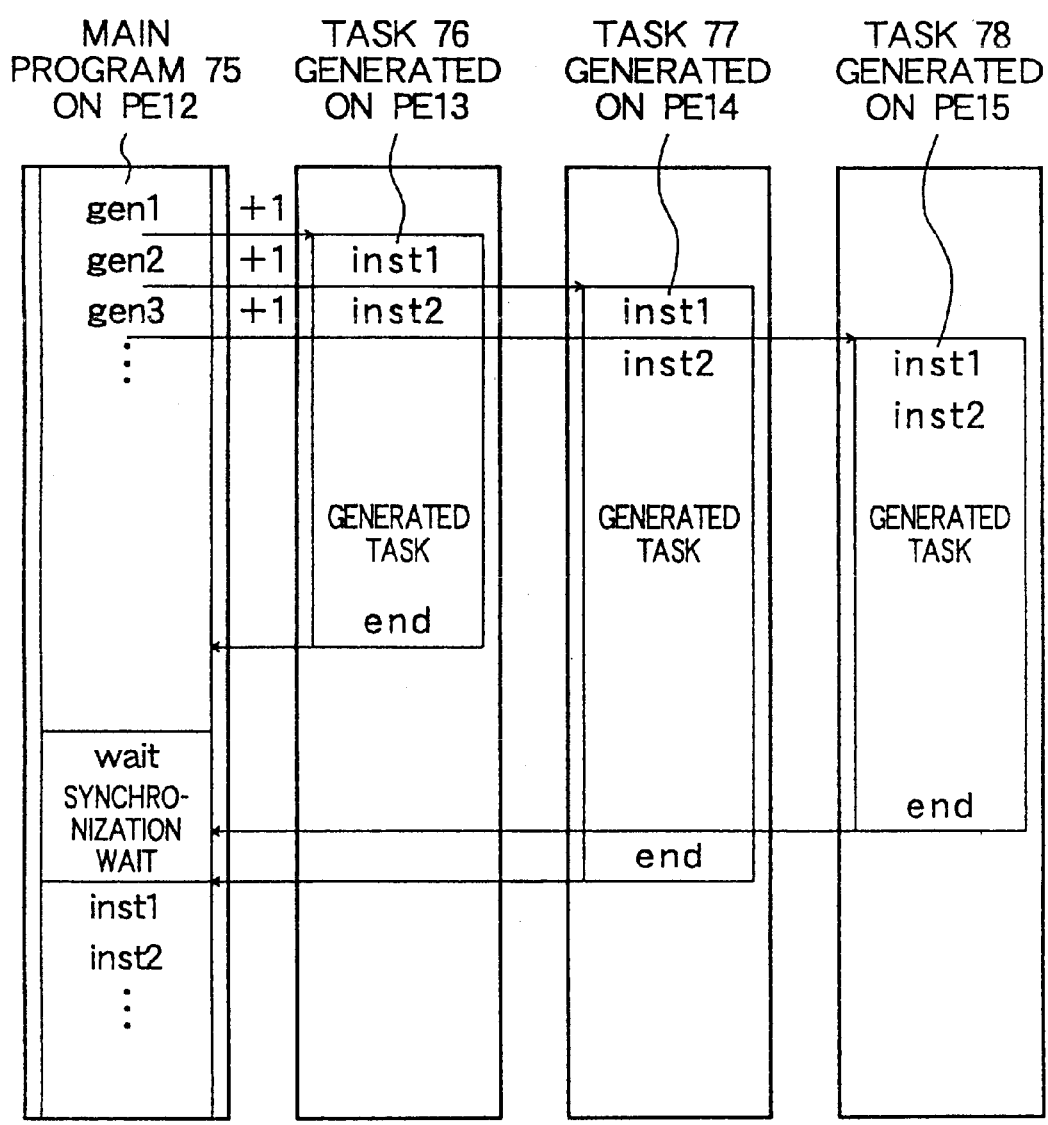
FIG. 4 is a view for explaining the program operating on each processor element PE in a case where a plurality of tasks are generated in the multi-processor system shown in FIG. 1 and the end of all tasks is set as a condition of the synchronization wait.
Figure 5:
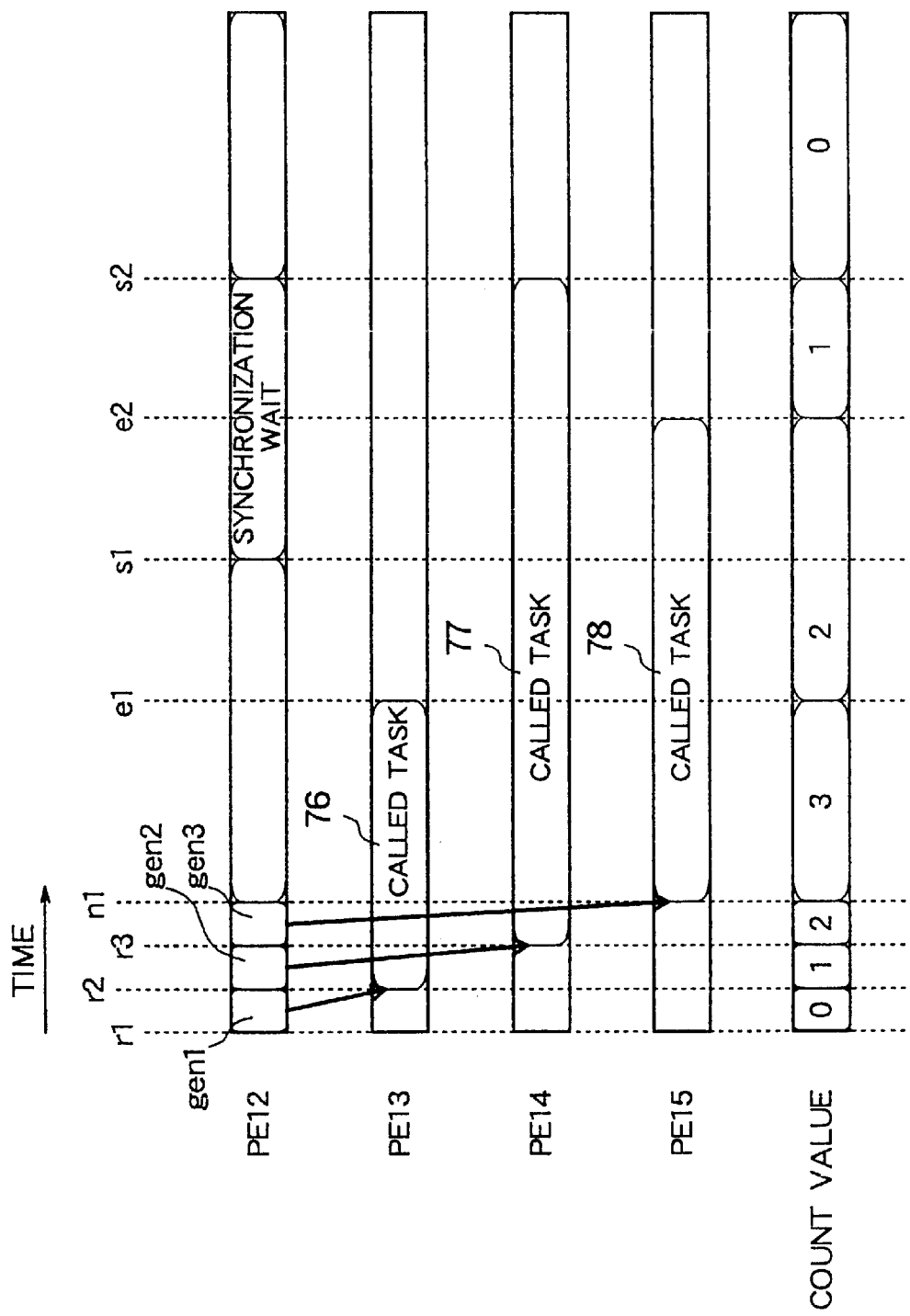
FIG. 5 is a view for explaining timings of task generation and synchronization wait release in the case shown in FIG. 4.

FIG. 4 is a view for explaining a program operating on each processor element PE in a case where the multi-processor system 51 generates a plurality of tasks and makes the end of all tasks a condition of the synchronization wait FIG. 5 is a view for explaining timings of task generation and synchronization wait release in the case shown in FIG. 4.

In the example shown in FIG. 4 and FIG. 5, the condition for synchronization wait release indicated by the "wait" command of the main program 75 shown in FIG. 4 is the count value "0".

In this case, at the timing "r1" shown in FIG. 5, the processor element PE12 executes a "gen1" command contained in the main program 75 shown in FIG. 4 and, at a timing "r2", a task 76 is generated on the processor element PE13. At this time, the count value of the arbiter 56 is set to "1".

Also, at the timing "r2" shown in FIG. 5, the processor element PE12 executes a "gen2" command contained in the main program 75 shown in FIG. 4 and, at a timing "r3", a task 77 is generated on the processor element PE14. At this time, the count value of the arbiter 56 is set to "2".

Further, at the timing "r3" shown in FIG. 5, the processor element PE12 executes a "gen3" command contained in the main program 75 shown in FIG. 4 and, at the timing "n1", a task 78 is generated on the processor element PE15. At this time, the count value of the arbiter 56 is set to "3".

Then, the processor element PE13 executes commands such as "inst1" and "inst2" contained in the task 76 from the timing "r2".

Also, the processor element PE14 executes commands such as "inst1" and "inst2" contained in the task 77 from the timing "r3".

Further, the processor element PE15 executes commands such as "inst1" and "inst2" contained in the task 78 from the timing "n1".

Then, at a timing "e1" shown in FIG. 5, the processor element PE13 executes the "end" command of the task 76, whereupon the task 76 is ended and the count value of the arbiter 56 is decremented by 1 to become "2".

Next, at the timing "s1" shown in FIG. 5, the processor element PE12 executes the "wait" command shown in FIG. 4. At this time, since the count value of the arbiter 56 is "2", the condition for synchronization wait release is not satisfied so the processor element PE12 enters the synchronization wait state.

Next, at a timing "e2" shown in FIG. 5, the processor element PE15 executes the "end" command of the task 78, whereupon the task 78 is ended and the count value of the arbiter 56 is decremented by 1 to become "1".

Next, at the timing "s2" shown in FIG. 5, the processor element PE14 executes the "end" command of the task 77, whereupon the task 77 is ended and the count value of the arbiter 56 is decremented by 1 to become "0".

By this, the condition for synchronization wait release indicated by the "wait" command of the main program 75 is satisfied, and the synchronization wait of the processor element PE12 is released.

Case Where Plurality of Slave Tasks are Generated (Second)

Figure 6:
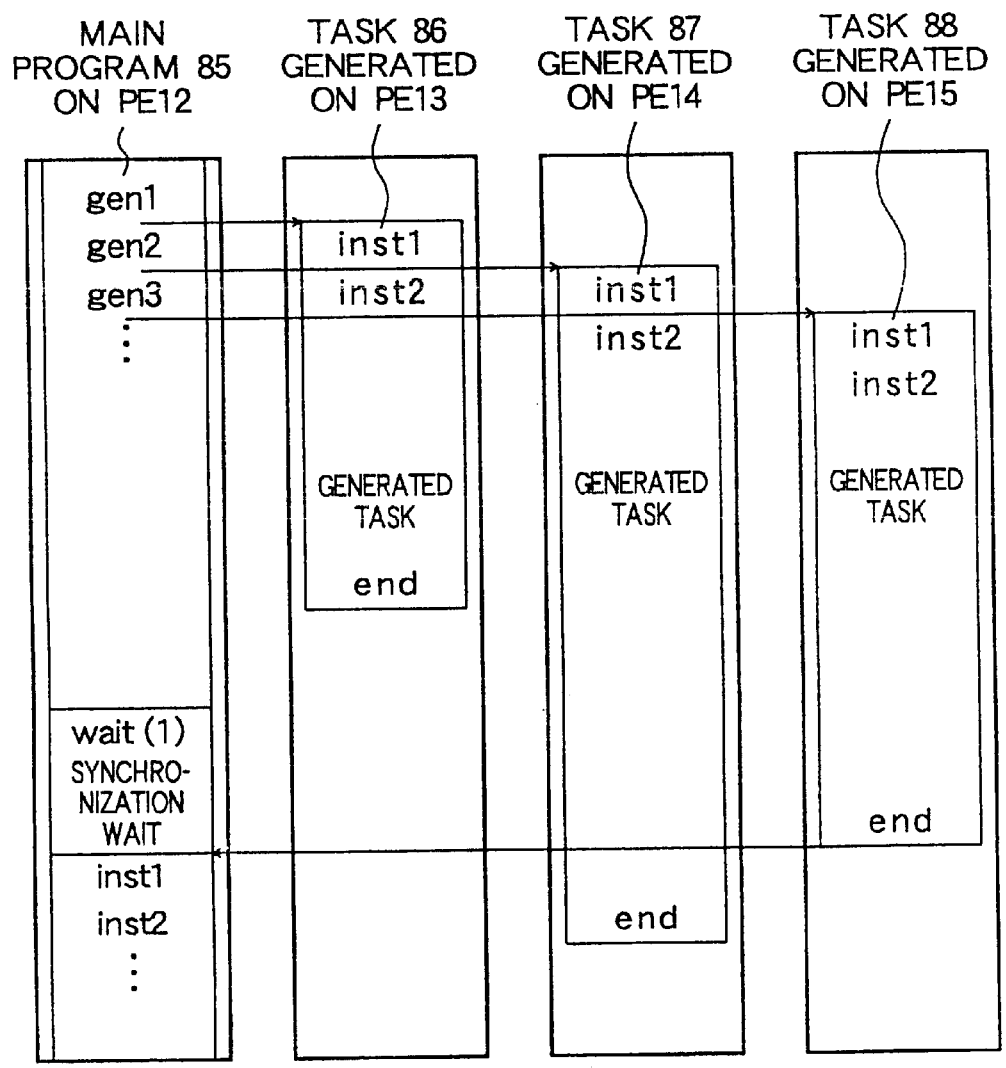
FIG. 6 is a view for explaining the program operating on each processor element PE in a case where a plurality of tasks are generated in the multi-processor system shown in FIG. 1 and the end of two tasks is set as a condition of the synchronization wait.
Figure 7:
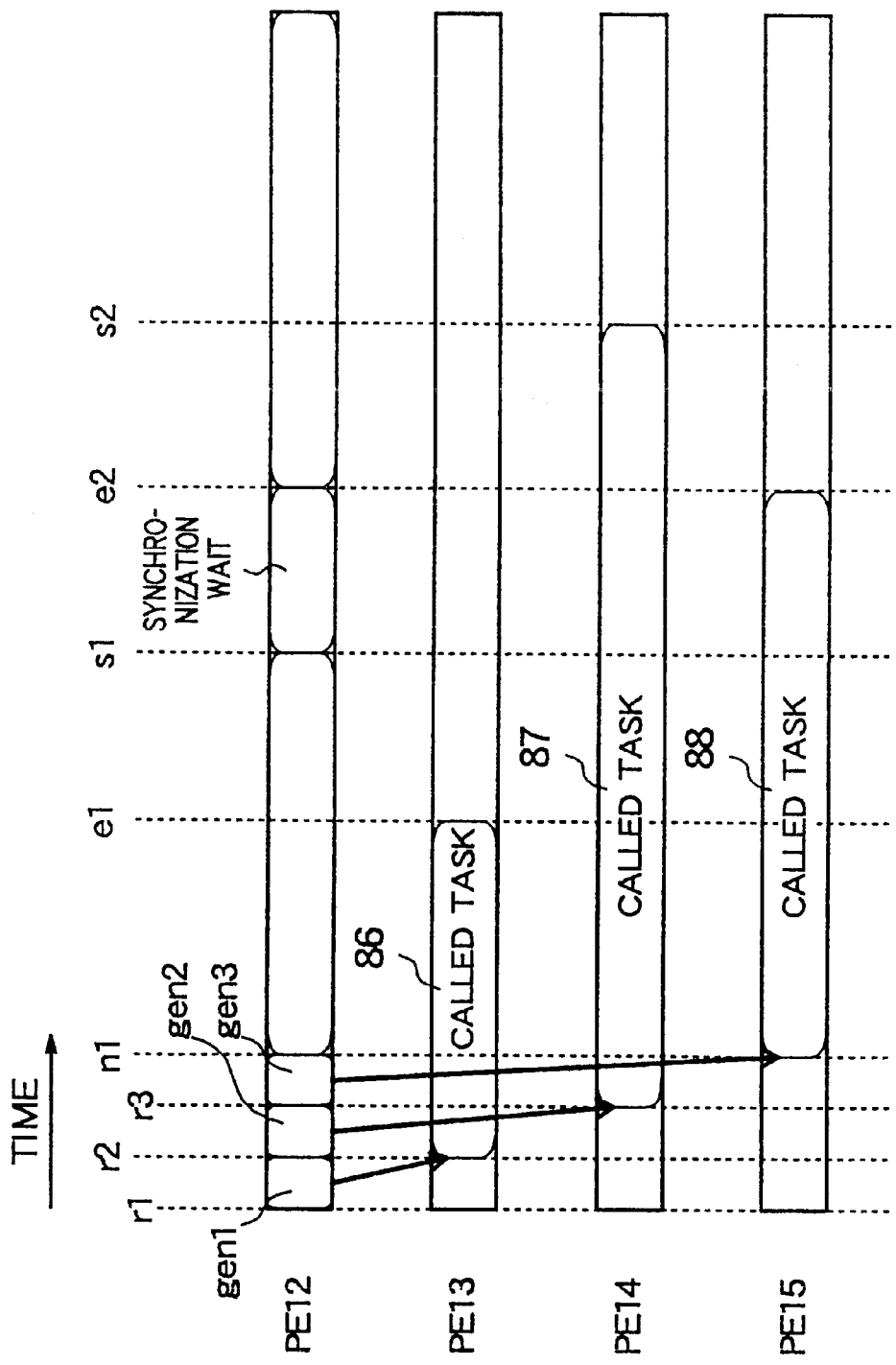
FIG. 7 is a view for explaining timings of task generation and synchronization wait release in the case shown in FIG. 6.

FIG. 6 is a view for explaining a program operating on each processor element PE in a case in which the multi-processor system 51 generates a plurality of tasks and makes the end of two tasks a condition of the synchronization wait FIG. 7 is a view for explaining timings of task generation and synchronization wait release in the case shown in FIG. 6.

In the example shown in FIG. 6 and FIG. 7, the condition of synchronization wait release indicated by the "wait" command of the main program 85 shown in FIG. 6 is the count value "1".

In this case, at the timing "r1" shown in FIG. 7, the processor element PE12 executes the "gen1" command contained in the main program 85 shown in FIG. 6 and, at the timing "r2", a task 86 is generated on the processor element PE13. At this time, the count value of the arbiter 56 is set to "1".

Also, at the timing "r2" shown in FIG. 7, the processor element PE12 executes the "gen2" command contained in the main program 85 shown in FIG. 6 and, at the timing "r3", a task 87 is generated on the processor element PE14. At this time, the count value of the arbiter 56 is set to "2".

Further, at the timing "r3" shown in FIG. 7, the processor element PE12 executes the "gen3" command contained in the main program 85 shown in FIG. 6 and, at the timing "n1", a task 88 is generated on the processor element PE15. At this time, the count value of the arbiter 56 is set to "3".

Then, the processor element PE13 executes commands such as "inst1" and "inst2" contained in the task 86 from the timing "r2".

Also, the processor element PE14 executes commands such as "inst1" and "inst2" contained in the task 87 from the timing "r3".

Further, the processor element PE15 executes commands such as "inst1" and "inst2" contained in the task 88 from the timing "n1".

Then, at the timing "e1" shown in FIG. 7, the processor element PE13 executes the "end" command of the task 86, whereupon the task 86 is ended and the count value of the arbiter 56 is decremented by 1 to become "2".

Next, at the timing "s1" shown in FIG. 7, the processor element PE12 executes the "wait" command shown in FIG. 6. At this time, since the count value of the arbiter 56 is "2", the condition for synchronization wait release is not satisfied, so the processor element PE12 enters the synchronization wait state.

Next, at the timing "e2" shown in FIG. 7, the processor element PE15 executes the "end" command of the task 88, whereupon the task 88 is ended and the count value of the arbiter 56 is decremented by 1 to become "1". By this, the condition for synchronization wait release indicated by the "wait" command of the main program 75 is satisfied, and the synchronization wait of the processor element PE12 is released.

In this way, in the example shown in FIG. 6 and FIG. 7, the end of two slave tasks among three slave tasks 86, 87, and 88 generated by the main program 85 shown in FIG. 6 is described in the argument of the "wait" command. As a result, when the tasks 86 and 88 are ended, the synchronization wait state can be released without waiting for the end of the task 87.

Here, as the task 87, for example, tasks which exist for a long period of time such as tasks for supporting a virtual memory are applied.

As explained above, according to the multi-processor system 51, even in a case where multi-tasking is realized, the problem of the synchronization wait of a program generating a plurality of tasks can be solved without complex management by the operating system.

However, in the above-mentioned multi-processor system 51, for example, as shown in FIG. 6, in a case where it is intended to release the synchronization wait by the "wait" command of the main program 85 without waiting for the end of the task 87 when the tasks 86 and 88 are ended, a programmer must know whether or not the task 87 has been ended when both of the tasks 86 and 88 are ended for setting the count value serving as the argument of the "wait" command.

For this reason, there is the problem that the load of the programmer when developing the main program 85 is large and the development period becomes longer. Further, there is also a problem in that the work for deciding the timing of the end of a plurality of tasks for setting the count value serving as the argument of the "wait" command is troublesome and also errors are apt to occur. Particularly, in a case where the number of tasks is large or a case where characteristics are different among a plurality of tasks, the judgement of the related ending timing is very difficult.

Second Embodiment

The multi-processor system of the second embodiment solves the problems of the multi-processor system 51 of the first embodiment mentioned above and basically has the same configuration as that of the multi-processor system 51 shown in FIG. 1 except for the arbiter.

Figure 8:
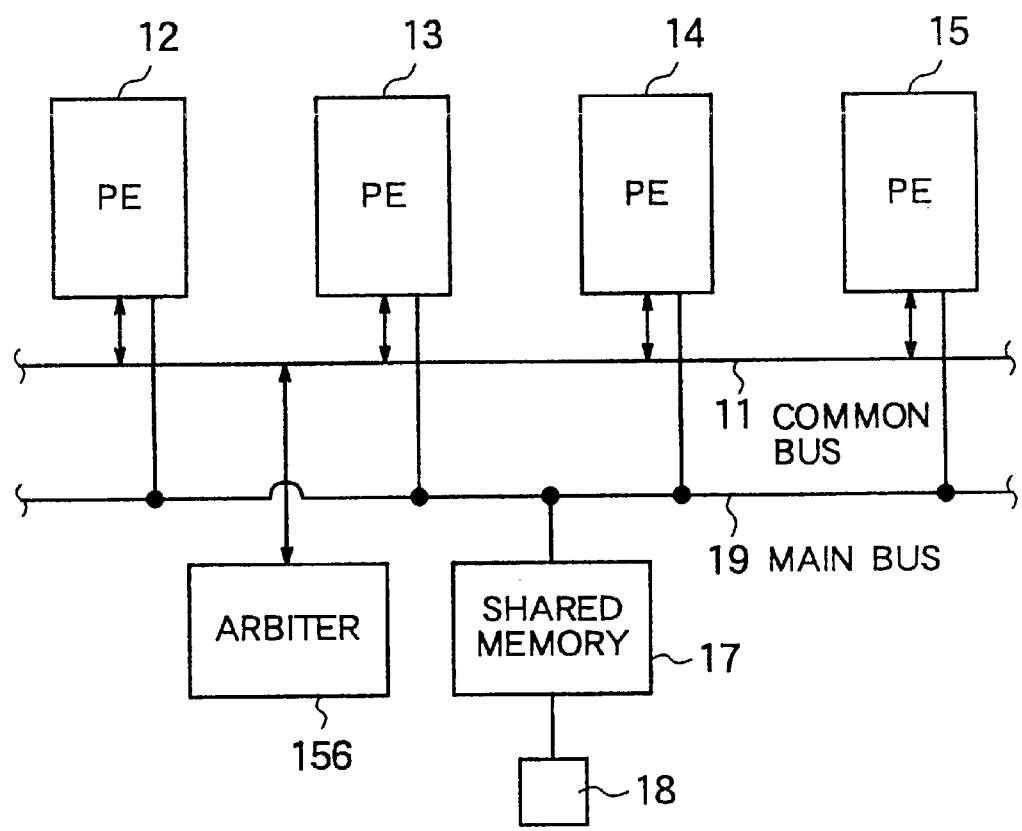
FIG. 8 is a view of the configuration of a multi-processor system according to a second embodiment of the present invention.

FIG. 8 is a view of the configuration of a multi-processor system 151 according to the present embodiment.

As shown in FIG. 8, the multi-processor system 151 comprises four processor elements PE12, PE13, PE14, and PE15 and an arbiter 156 for managing the synchronization of tasks connected via the common bus 11.

Further, in the multi-processor system 151, the processor elements PE12, PE13, PE14, and PE15 are connected to the common memory 17 via the main bus 19.

The common memory 17 is connected to the external memory (main memory) via the external terminal 18.

In FIG. 8, the processor elements PE12, PE13, PE14, and PE15, common bus 11, main bus 19, common memory 17, and external terminal 18 given the same reference numerals as those in FIG. 1 are the same as the constituent elements shown in FIG. 1 mentioned above.

Namely, the multi-processor system 151 is characterized in the method of management of task synchronization in the arbiter 156.

Figure 9:
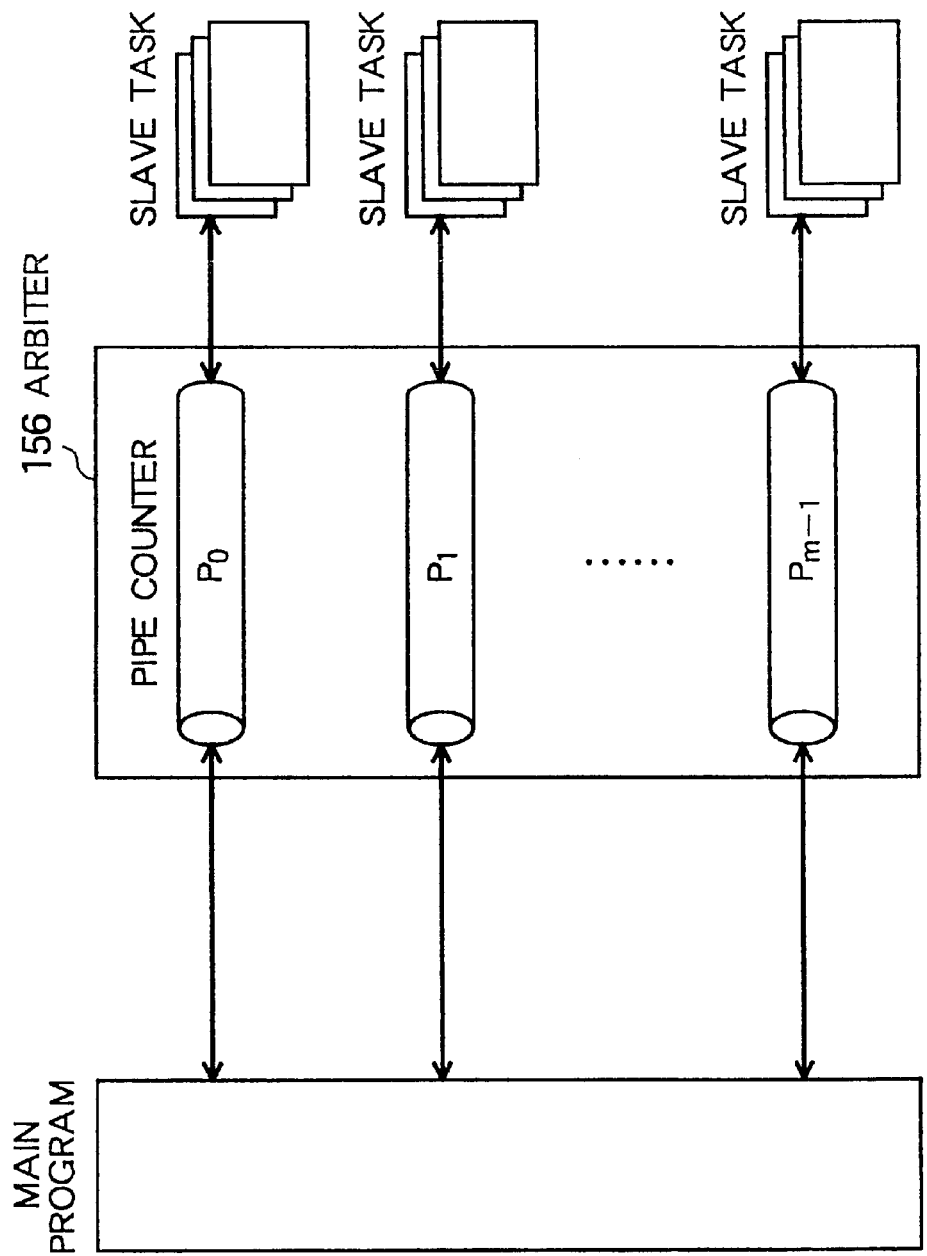
FIG. 9 is a view of the configuration of an arbiter shown in FIG. 8.

The arbiter 156 is provided with, as shown in FIG. 9, m (where m is an integer of 2 or more) number of pipe counters $p_0$ to $p_{m-1}$ as a plurality of counting means. The function of the pipe counters $p_0$ to $p_m$ is basically the same as the counter function of the arbiter 56 of the first embodiment mentioned above. Here, the task generation command "gen" of the main program contains an identifier as the counting means specifying data for designating the pipe counters $p_0$ to $p_m$.

Figure 10:
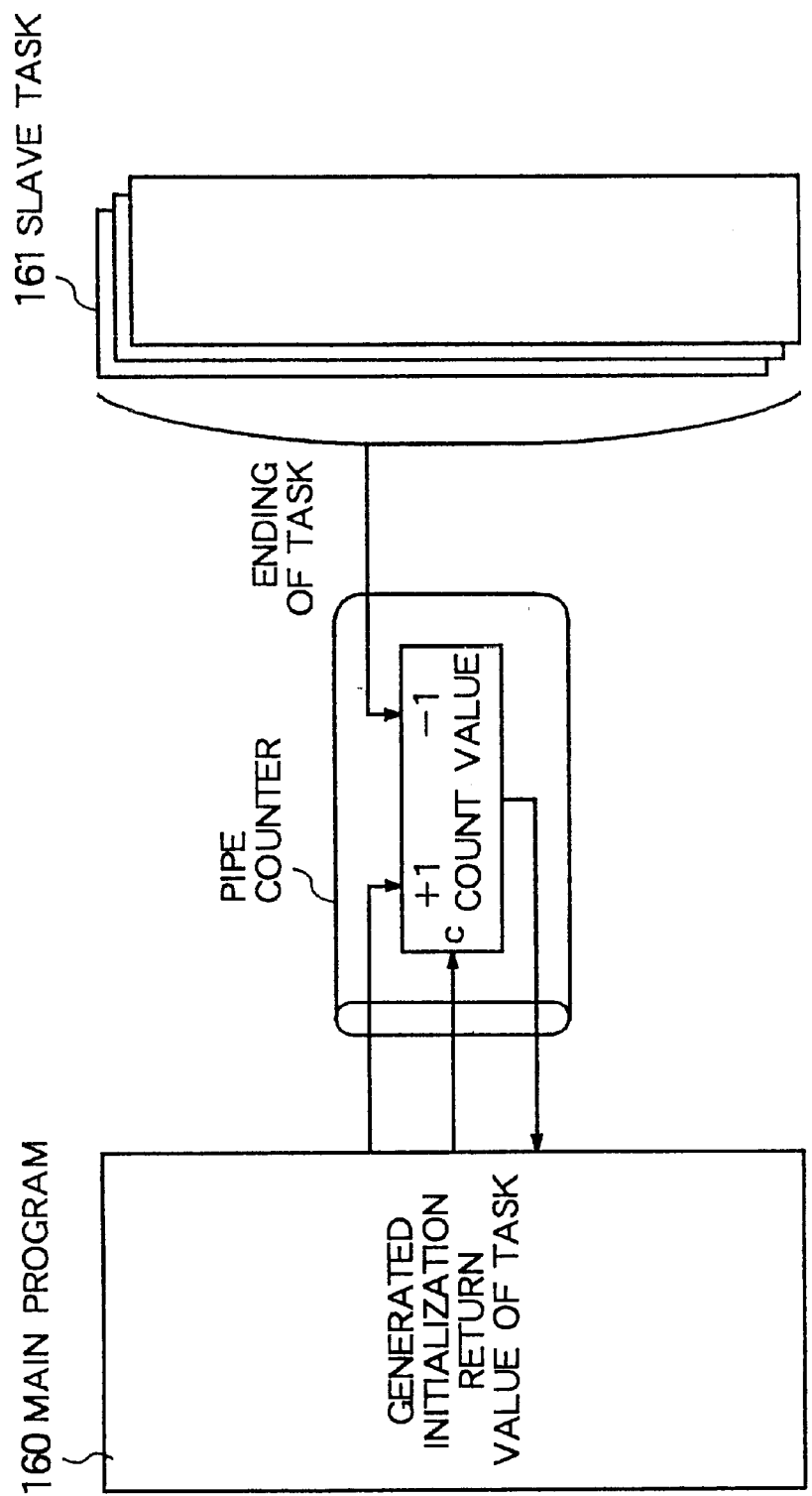
FIG. 10 is a view for explaining the function of a pipe counter shown in FIG. 9.

The pipe counters $p_0$ to $p_{m-1}$ for example as shown in FIG. 10 increase the count value by 1 when the task generation command "gen" of a main program 160 is executed and the task generation command "gen" designates itself and decreases the count value by 1 when a slave task 161 generated by the related task generation command "gen" is ended.

Further, the pipe counters $p_0$ to $p_{m-1}$ reset the count value when the main program 160 executes the initialization command. Further, the pipe counters $p_0$ to $p_{m-1}$ output the count value as a return value to the main program 160.

Further, the "wait" command, that is, the synchronization command (synchronization wait command) described in the main program, contains an identifier for designating a pipe counter in addition to the count value which satisfies the synchronization condition.

The processor element PE receives as its input the count values of the pipe counters $p_0$ to $p_{m-1}$ designated by the related "wait" command as a return value when executing the "wait" command and decides that the synchronization condition is satisfied when the related input count value and the count value contained in the related "wait" command coincide or the related input count value is smaller.

Below, an explanation will be made of the operation of the multi-processor system 151 shown in FIG. 8.

Figure 11:
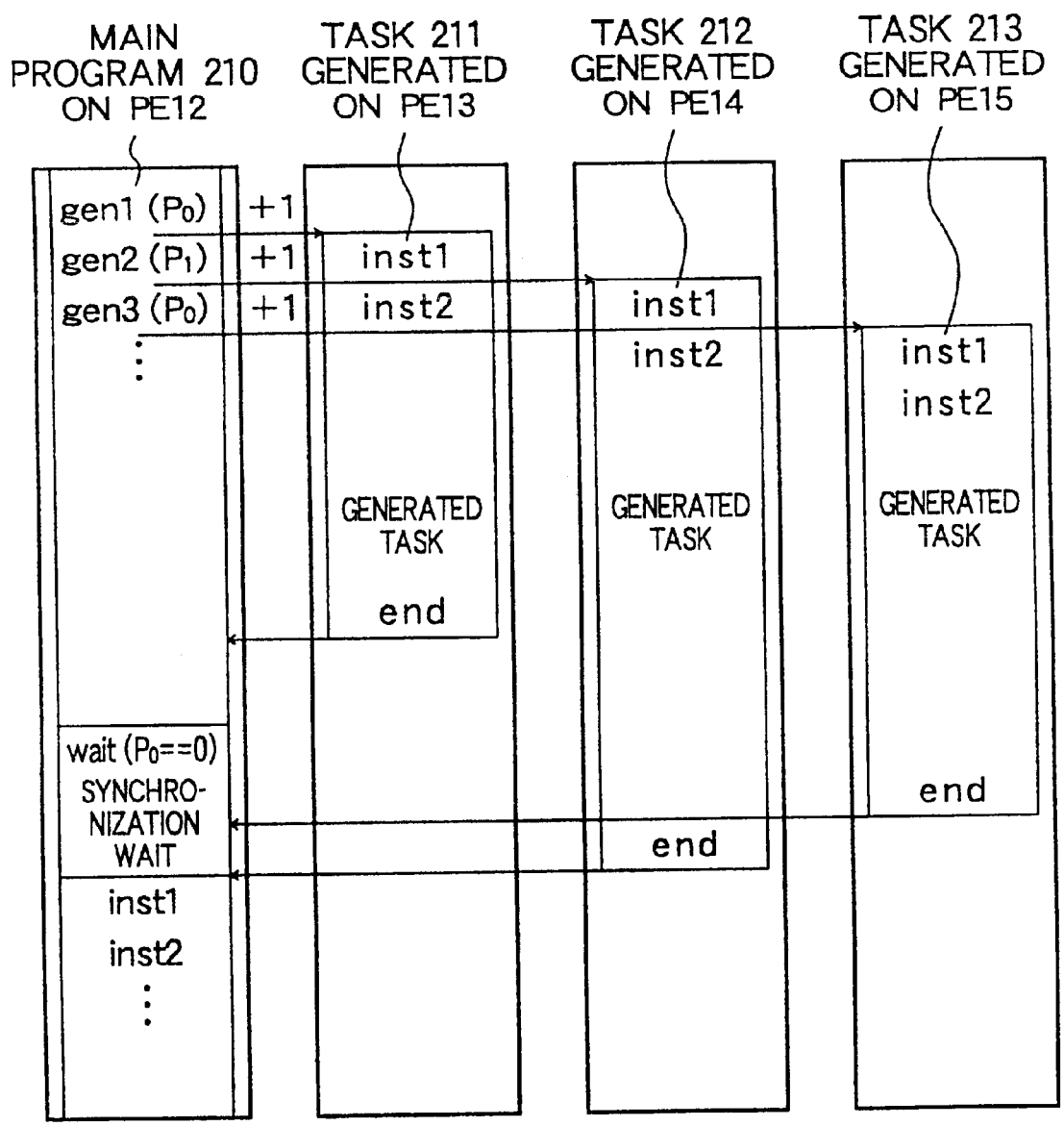
FIG. 11 is a view for explaining a main program operating on the processor element PE and the tasks in the multi-processor system shown in FIG. 8.
Figure 12:
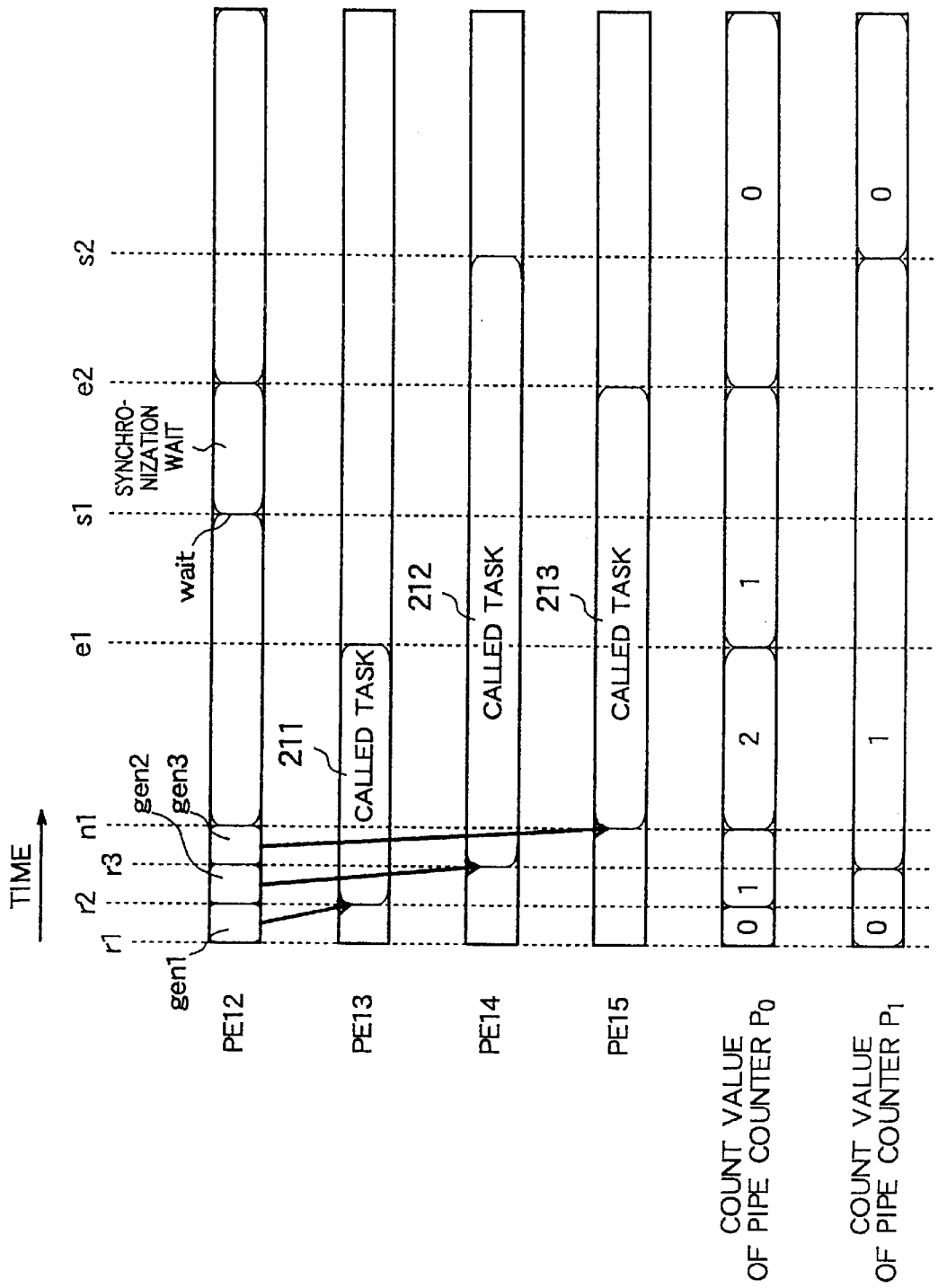
FIG. 12 is a view for explaining timings of task generation and synchronization wait release in the case shown in FIG. 11.

FIG. 11 is a view for explaining a main program 210 operating on the processor element PE12 and tasks 211 to 213 operating on the processor elements PE13 to PE15 in the multi-processor system 151 FIG. 12 is a view for explaining timings of task generation and synchronization wait release in the case shown in FIG. 11.

In FIG. 11, the main program 210 to be executed in the processor element PE12 serving as the first processing means describes the task generation commands "gen1", "gen2", and "gen3" and the synchronization wait command "wait".

Here, the task generation command "gen1" is the command for generating the task 211 at the processor element PE13 serving as the second processing means and designates the pipe counter $p_0$.

Also, the task generation command "gen2" is the command for generating the task 212 at the processor element PE14 serving as the second processing means and designates the pipe counter $p_1$.

Further, the task generation command "gen3" is the command for generating the task 213 at the processor element PE15 serving as the second processing means and designates the pipe counter $p_0$.

Furthermore, the "wait" command designates the count value of the pipe counter $p_0$ becoming "0" as the condition of synchronization wait release.

When the main program 210 shown in FIG. 11 is executed on the processor element PE12, at the timing "r1" shown in FIG. 12, the processor element PE12 executes the "gen1" command of the main program 210 shown in FIG. 11 and, at the timing "r2", the task 211 is generated on the processor element PE13. At this time, since the "gen1" command designates the pipe counter $p_0$, the count value of the pipe counter $p_0$ is incremented and set to "1".

Further, at the timing "r2" shown in FIG. 12, the processor element PE12 executes the "gen2" command contained in the main program 210 shown in FIG. 11 and, at the timing "r3", the task 212 is generated on the processor element PE14. At this time, since the "gen2" command designates the pipe counter $p_1$, the count value of the pipe counter $p_1$ of the arbiter 156 is incremented and set to "1".

Furthermore, at the timing "r3" shown in FIG. 12, the processor element PE12 executes the "gen3" command contained in the main program 210 shown in FIG. 11 and, at the timing "n1", the task 213 is generated on the processor element PE15. At this time, since the "gen3" command designates the pipe counter $p_0$, the count value of the pipe counter $p_0$ of the arbiter 156 is incremented and set to "1".

Then, the processor element PE13 executes the commands such as "inst1" and "inst2" contained in the task 211 from the timing "r2".

Further, the processor element PE14 executes the commands such as "inst1" and "inst2" contained in the task 212 from the timing "r3".

Furthermore, the processor element PE15 executes the commands such as "inst1" and "inst2" contained in the task 213 from the timing "n1".

Then, at the timing "e1" shown in FIG. 12, the processor element PE13 executes the "end" command as the task ending command of the task 211, whereupon the task 211 is ended and the count value of the pipe counter $p_0$ is decremented by 1 to become "1".

Next, at the timing "s1" shown in FIG. 12, the processor element PE12 executes the "wait" command shown in FIG. 11. At this time, since the count value of the pipe counter $p_0$ of the arbiter 156 is "1" and does not satisfy the count value "0" of the pipe counter $p_0$ serving as the condition for synchronization wait release of the "wait" command, the processor element PE12 enters the synchronization wait state.

Next, at the timing "e2" shown in FIG. 12, the processor element PE15 executes the "end" command of the task 213, whereupon the task 213 is ended and the count value of the pipe counter $p_0$ is decremented by 1 to become "0". By this, the condition for synchronization wait release indicated by the "wait" command of the main program 210 is satisfied, and the synchronization wait of the processor element PE12 is released.

In this way, in the example shown in FIG. 11 and FIG. 12, when the tasks 211 and 213 are ended, the synchronization wait state of the main program 210 can be released without waiting for the end of the task 212.

Figure 13:
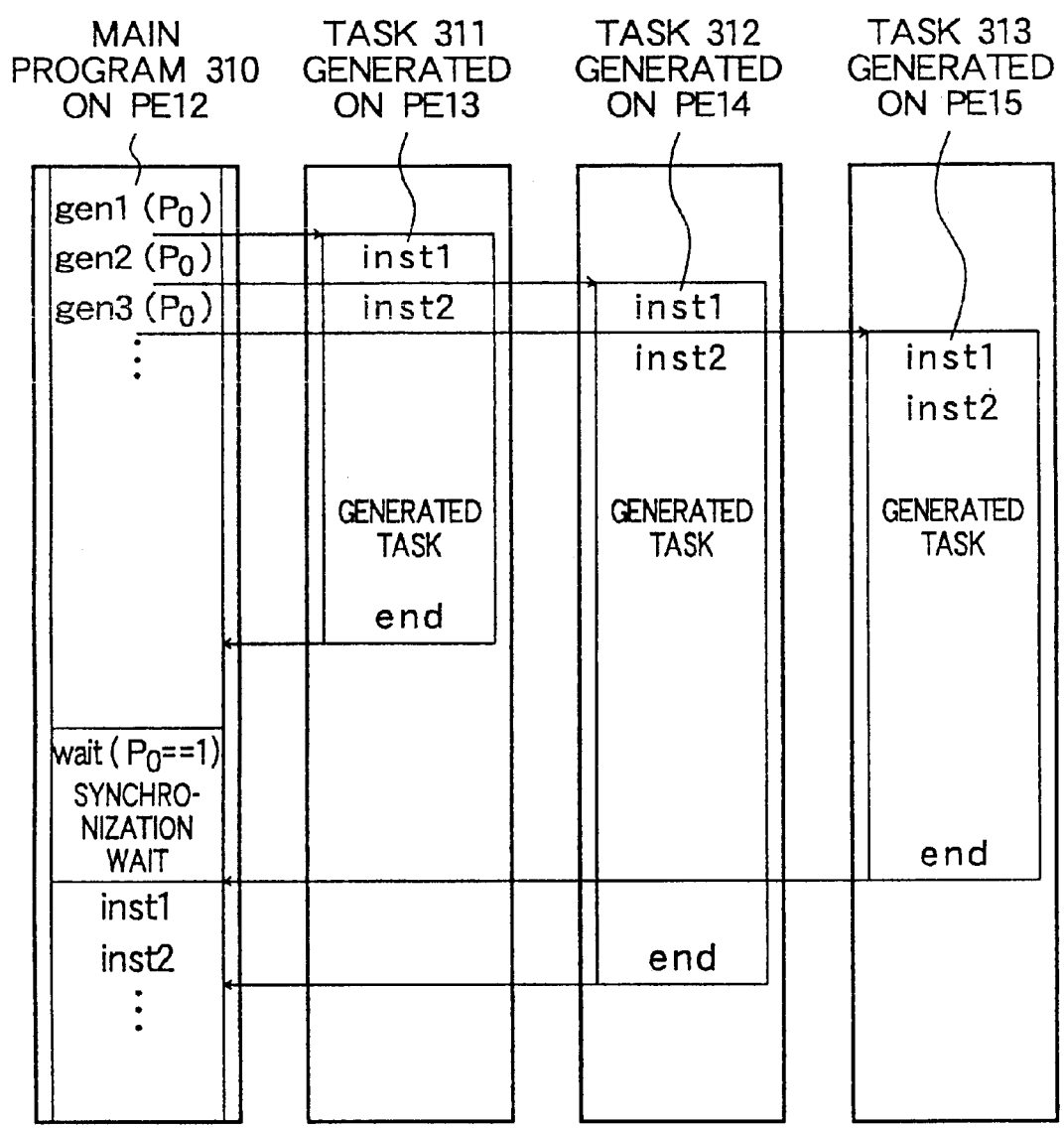
FIG. 13 is a view for explaining another example of a main program operating on the processor element PE and the tasks in the multi-processor system shown in FIG. 8.

Further, in order to perform the same operation as the operation shown in FIG. 12 by the multi-processor system 151, for example, as shown in FIG. 13, it is possible even if all of the task generation commands "gen1", "gen2", and "gen3" designate the pipe counter $p_0$, and the condition for synchronization wait release in the synchronization command "wait" is set to the count value "1" of the pipe counter $p_0$.

As explained above, according to the multi-processor system 151, for example, when the tasks 211 and 213 in which the "gen1" and "gen3" of the main program 210 shown in FIG. 11 are ended, where it is desired to release the synchronization wait by the synchronization command "wait" of the main program 210 without waiting for the end of the task 212 generated by the "gen3", it is sufficient so far as the pipe counter $p_0$ is designated by "gen" and "gen3" and the count value of the pipe counter $p_0$ becoming "0" is made a condition for the synchronization wait release in the synchronization command "wait". The synchronization command "wait" can be described without considering the end timing of the task 212.

For this reason, according to the multi-processor system 151, the load when the programmer describes the main program 210 can be reduced, the program development period can be shortened, and, at the same time, a high quality program with few mistakes can be developed.

Further, while the task management by the multi-processor system 151 is slightly limited in terms of general purpose use when compared with task management by software, but it becomes extremely easy to realize the synchronization wait mechanism by hardware. This is effective as a method for determining the fact of the end of a task at a high speed. Further, there is the effect that the size of the circuit can be made smaller.

Further, by describing the argument in the "wait" command, that is, the synchronization wait command, the synchronization condition between the main program and the slave task generated by the related main program can be flexibly set.

For example, in FIG. 11, the multi-processor system 151 is particularly effective when it can be determined in advance that a slave task 212 generated on the processor element PE14 will take an extremely long time until completion of the program compared with other slave tasks 211 and 213 and further it will be necessary to generate a slave task by the same main program 210 on the processor element PE12.

The present embodiment deliberately assumed an extreme case. However, it can be generally said that there is a difference of length in the processing times of tasks. In order to realize multi-tasking on the multi-processor system, it is required to link processor resources and threads (i.e., a concept on operating system meaning fragments of tasks) by some sort of method. In order to effectively use the processor resources, it is necessary to precisely determine the processor operating states on the system. Further, it is not desirable that the entire system be influenced by the operating state of any particular processor.

When realizing multi-tasking on a multi-processor system using the related art, as mentioned above, it becomes difficult to effectively use the processor resources.

That is, with software control, it is possible to allocate a new task to a processor not operating, but considerable time will be spent up to that decision. As a result, this means that the entire system slowly operates.

Contrary to this, according to the multi-processor system 151, since only a counter is used as the means for solving the problem of synchronization wait and complex software is not used, the problem of synchronization wait can be solved at a high speed and the real time property can be improved.

Further, in the related art using hardware, the generation of the slave tasks and the synchronization mechanism can be realized simply and at a high speed, but it becomes difficult to generate a plurality of tasks. Even if a plurality of tasks were generated, all of the tasks which had been generated would have to be waited for.

Contrary to this, according to the multi-processor system 151, by setting the number of pipe counters and tasks for the synchronization wait in the "wait" command as the argument, diverse and flexible synchronization wait operations can be realized.

In loading the operating system, when new tasks are generated, it is necessary to determine how many tasks among the tasks which have been generated have been ended and then determine to which processor elements PE these tasks are allocated. Conversely, if the end of all tasks is waited for, the allocation of new tasks to the processor elements PE will not possible or will be possible only with great difficulty.

Accordingly, as in the multi-processor system 151 mentioned above, if the state ending of tasks is monitored in the main program to generate the task and the values thereof can be reflected in the synchronization mechanism, the performance of the multi-processor system can be improved.

The present invention is not limited to the above embodiments.

For example, in the embodiments, the case where a plurality of slave tasks were generated from a single main program was exemplified, but it is also possible to generate a plurality of slave tasks from a plurality of main programs.

In this case, mutually different pipe counters are allocated to the plurality of main programs. By this, the plurality of main programs can generate slave tasks and wait for the end of the slave tasks. It is possible for one main program to use a plurality of pipe counters. Further, it is possible for a slave task to become a new main program and further generate slave tasks. By this, it is possible to raise the degree of freeness of the programming and develop programs more efficiently.

Also, in the embodiments, the case where the processor element PE12 shown in FIG. 1 and FIG. 8 executes the "gen" command as the task generation command was exemplified, but it is possible even if other processor elements PE13 to PE15 execute the "gen" command.

Further, in the examples shown in FIG. 1 and FIG. 8, the case where four processor elements PE12 to PE15 were provided was exemplified, but there many be any number of the processor elements PE over two.

In the embodiments, the case where the task synchronization function was imparted to the arbiters 56 and 156 was exemplified, but it is possible for the task synchronization function to be imparted to other constituent elements.

Figure 14:
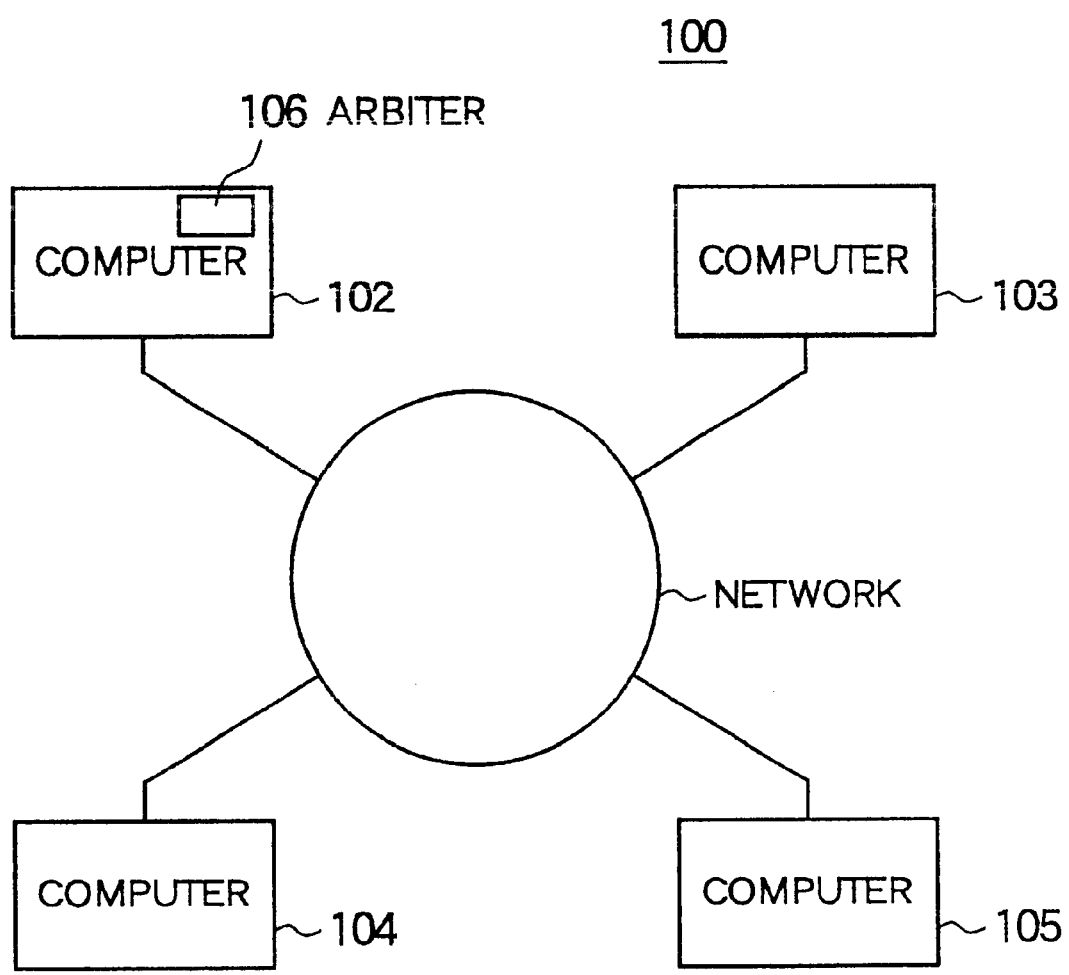
FIG. 14 is a view of the configuration of a parallel dispersed processing system to which the present invention is applied.

Further, the present invention can also be applied to a parallel dispersed processing system for performing the dispersed processing by connecting computers 102, 103, 104, and 105 via a network 101 as shown in for example FIG. 14.

In this case, for example, if the computer 102 executes the main program, the arbiter 106 is provided inside the computer 102. The function of the arbiter 106 is the same as that of the arbiter 56 shown in FIG. 1 or the arbiter 156 shown in FIG. 8 mentioned above.

Summarizing the advantageous effects of the invention, as explained above, according to the parallel processing apparatus of the present invention, the problem of synchronization wait when a first processing means calls up a plurality of tasks can be flexibly solved at a high speed.

Also, according to the parallel processing apparatus of the present invention, the load of the programmer when preparing a program to be executed by the first processing means can be reduced and the preparation of a high quality program with few mistakes is enabled.

Further, according to the parallel processing method of the present invention, the problem of synchronization wait when a first processing calls up a plurality of tasks can be flexibly solved at a high speed.

Furthermore, according to the parallel processing method of the present invention, the load of the programmer when preparing the program of the first processing can be reduced and preparation of the high quality program with few mistakes is enabled.

What is claimed is:

1. A parallel processing apparatus comprising:

a plurality of counting means;

a first processing means for executing at least one task call command including counting means designating data for designating one of said counting means, then waiting for synchronization by a synchronization wait command including counting means designating data and a count value satisfying the synchronization wait release conditions; and at least one second processing means for executing a task called up from said first processing means and executing a task end command when said called up task has ended, wherein, each of said plurality of counting means increases the count value indicated by the counting means designating data included in said task call command in accordance with execution of said task call command by said first processing means and decreases the count value indicated by the counting means designating data included in said task call command in accordance with execution of the task end command by said second processing means, the first processing means compares the count value included in the synchronization wait command and the count value of the counting means indicated by the counting means designating data included in the synchronization wait command and determines whether to release the synchronization wait in accordance with the result of the comparison.

2. A parallel processing apparatus as set forth in claim 1, wherein the first processing means releases the synchronization wait when the count value included in the synchronization wait command and the count value of the counting means indicated by the counting means designating data included in the synchronization wait command coincide.

3. A parallel processing apparatus as set forth in claim 2, wherein the count value included in the synchronization wait command is smaller than the number of tasks called up by a task call command including the same counting means designating data as the synchronization wait command.

4. A parallel processing apparatus as set forth in claim 1, wherein the processing in the first processing means and the processing in the at least one second processing means are performed independently from each other.

5. A parallel processing apparatus as set forth in claim 1, wherein the synchronization wait command has, as arguments, the counting means designating data and the count value satisfying a synchronization wait release condition.

6. A parallel processing apparatus as set forth in claim 1, wherein the first processing means and the at least one second processing means are connected through a common bus.

7. A parallel processing method comprising:

executing, in a first processing, at least one task call command including counter designating data for designating one counter among a plurality of counters and waiting for synchronization by a synchronization wait command including counter designating data and a count value satisfying the synchronization wait release conditions;

executing, in at least one second processing, a task called up from said first processing and executing a task end command when said called up task has ended;

increasing the count value of a counter indicated by the counter designating data included in said task call command in accordance with execution of said task call command by said first processing and decreasing the count value of the counter indicated by the counter designating data of a task call command in accordance with execution of the task end command by said second processing; and comparing, in the first processing, the count value included in the synchronization wait command and the count value of the counter indicated by the counter designating data included in the synchronization wait command and determining whether to release the synchronization wait in accordance with the result of the comparison.

8. A parallel processing method as set forth in claim 7, wherein the first processing releases the synchronization wait when the count value included in the synchronization wait command and the count value of the counter indicated by the counter designating data included in the synchronization wait command coincide.

9. A parallel processing method as set forth in claim 8, wherein the count value included in the synchronization wait command is smaller than the number of tasks called up by a task call command including the same counter designating data as the synchronization wait command.

10. A parallel processing method as set forth in claim 7, wherein the first processing and the at least one second processing are performed independently from each other.

11. A parallel processing method as set forth in claim 7, wherein the synchronization wait command has, as arguments, the counter designating data and the count value satisfying a synchronization wait release condition.

12. A parallel processing apparatus comprising:

a first processing means for executing at lest one task call command, then performing synchronization wait by a synchronization wait command in accordance with need;

at least one second processing means for executing a task called up from said first processing means and executing a task end command at the time when said called up task has been ended; and a counting means for increasing a count value in accordance with execution of said task call command by said first processing means and decreasing a count value in accordance with execution of said task end command by said second processing means, said first processing means compares a count value included in said synchronization wait command and the count value of said counting means to determine whether to release the synchronization wait in accordance with the result of the comparison.

13. A parallel processing apparatus as set forth in claim 12, wherein said first processing means releases the synchronization wait when the count value included in the synchronization wait command and the count value of the counting means coincide.

14. A parallel processing apparatus as set forth in claim 13, wherein the count value included in the synchronization wait command is smaller than the number of tasks called up by said first processing means.

15. A parallel processing apparatus as set forth in claim 12, wherein in the processing in said first processing means and the processing in said second processing means are performed independently from each other.

16. A parallel processing apparatus as set forth in claim 12, wherein the synchronization wait command has, as argument, the said count value.

17. A parallel processing apparatus as set forth in claim 12, wherein said first processing means and said at least one second processing means are connected through a common bus.

18. A parallel processing method comprising:

executing, in a first processing, at least one task call command, then performing synchronization wait by a synchronization wait command in accordance with need;

executing, in at least one second processing, a task called up from said first processing, and a task end command at the time when the called up task has been ended;

increasing a first count value in accordance with execution of said task call command by said first processing and decreasing said first count value in accordance with execution of said task end command by said second processing; and comparing a second count value included in said synchronization wait command and said first count value and determining whether to release the synchronization wait in accordance with the result of the comparison.

19. A parallel processing method as set forth in claim 18, wherein, in said first processing, the synchronization wait is released when said second count value included in the synchronization wait command and said first count value coincide.

20. A parallel processing method as set forth in claim 19, wherein said second count value included in the synchronization wait command is smaller than the number of tasks called up by said first processing.

21. A parallel processing method as set forth in claim 18, wherein said first processing and said second processing are performed independently from each other.

22. A parallel processing method as set forth in claim 18, wherein the synchronization wait command has, as arguments, said count value.

* * * * *